June 1, 1954
R. GILMONT
2,679,759
ABSOLUTE AND DIFFERENTIAL MANOMETER
Filed Dec. 29, 1948
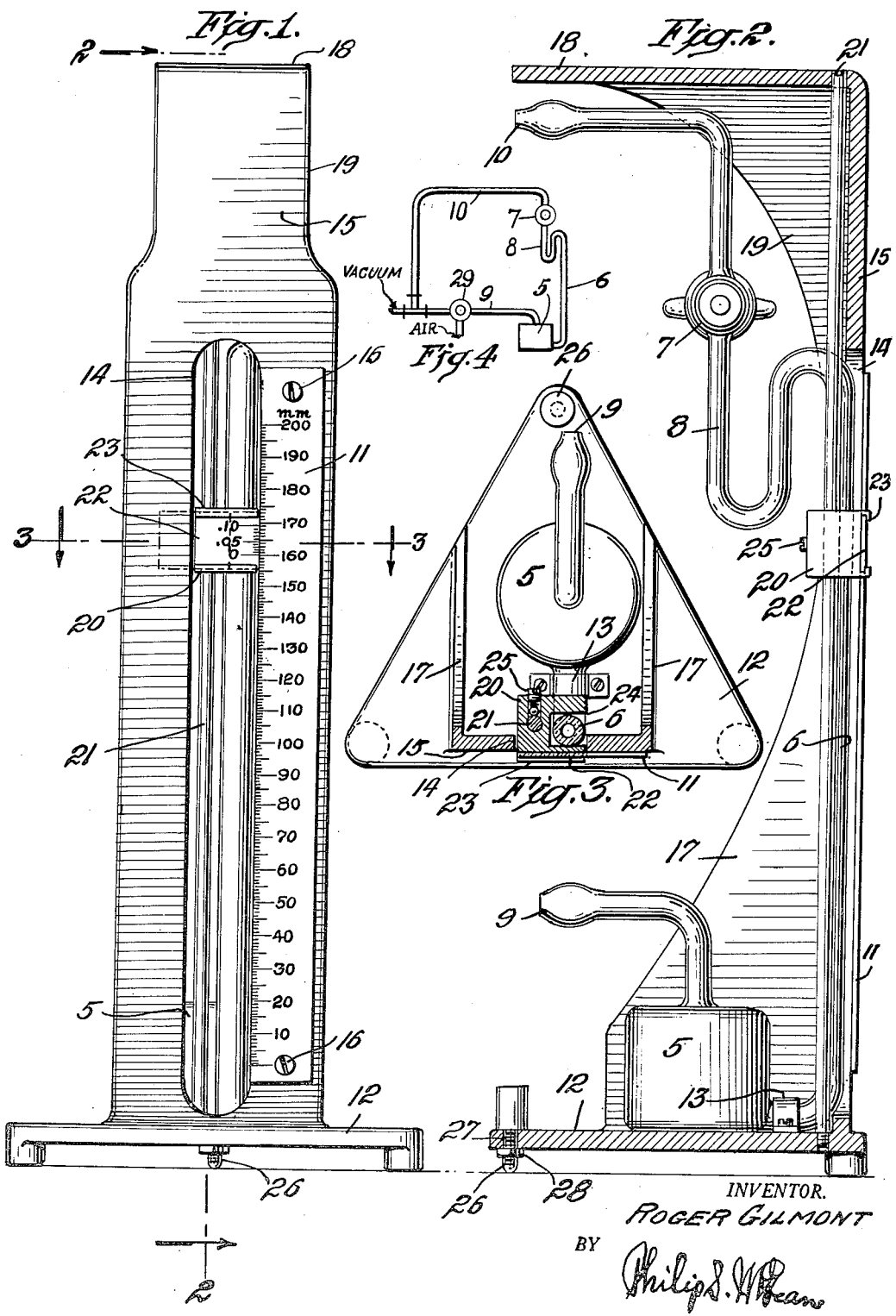
INVENTOR.
ROGER GILMONT
BY
ATTORNEY Patented June 1, 1954

2,679,759

UNITED STATES PATENT OFFICE 2,679,759

ABSOLUTE AND DIFFERENTIAL MANOMETER

Roger Gilmont, Brooklyn, N. Y., assignor to The Emil Greiner Company, New York, N. Y., a corporation of New York Application December 29, 1948, Serial No. 67,827

5 Claims. (Cl. 73—393)

The invention herein disclosed relates to mercurial manometers.

Objects of the invention are to provide a simple, practical instrument for rapid and precise measurement of pressure and vacuum and operable for either absolute or differential values.

Particularly it is a purpose of the invention to enable quick change-over from absolute to differential measurements, or vice versa.

Special objects of the invention are to provide a seal for the manometer tube when being used for absolute measurements and which will be effective at all such times despite use of the instrument at times for differential measurements.

Special objects of the invention also are to provide automatic compensation for changes in density of mercury due to varying room temperatures, thus to enable a single reading of the mercury level to give the true corrected pressure in mm. of Hg at 0° C.

Further special objects are to automatically compensate for variations in the scale readings due to temperature conditions.

Further special objects of the invention are to simplify cleaning and filling operations required for proper assembly and use of the manometer.

Additional important objects are to accomplish all the foregoing with a simple, rugged form of structure which can be produced at reasonable cost and in which any less rugged parts are fully protected and guarded against breakage or injury.

Special objects of the invention also are to facilitate quick, easy and accurate adjustment and reading of the instrument.

Other desirable objects attained by the invention are set forth or will appear in the course of the following specification detailing the important features of the invention and broadly claiming the same.

The drawing accompanying and forming part of the following specification illustrates a present commercial embodiment of the invention. Structure, however, may be modified and changed as regards this illustration, all within the true intent and scope of the invention as hereinafter defined and claimed.

Fig. 1 in the drawing is a front elevation of the new manometer;

Fig. 2 is a substantially central vertical sectional view of the same as on the plane of line 2—2 of Fig. 1;

Fig. 3 is a horizontal sectional view on substantially the plane of line 3—3 of Fig. 1.

Fig. 4 is a diagrammatic view illustrating the use of a three-way stopcock for facilitating the filling of the manometer tube.

The embodiment of the invention illustrated comprises a mercury reservoir 5 from which there rises a manometer tube 6.

This tube may be closed or opened at the top by means of a pressure-tight valve 7 and the sealing off of the upper end of the tube is made positive in the present disclosure by a sealing loop or trap 8 for the mercury, just below the shut-off valve.

The top of the reservoir and the upper end of the tube, above the valve, have tubular extensions 9, 10, for such pressure or vacuum connections as may be used for different measurements.

A suitable scale 11 is associated with the mercury column, laid off for instance in millimeters, as indicated.

For practical reasons the parts are all mounted in a stand of substantial construction, shown as having a flat, triangular base 12 on which the reservoir and manometer tube are held by a clamp 13, with the tube exposed up through a slot 14 in the front wall 15 of the stand.

The scale is shown fixedly secured as by screws 16 at one side of the vertical slot closely adjoining the tube.

The upright front wall of the stand is shown braced at the sides by vertical flanges 17 forming a partial enclosure about the reservoir.

A top wall 18 is shown extended from the upper end of the front wall rearwardly over the valve and mercury seal braced by side flanges 19 partially enclosing and protecting these parts.

To facilitate and make easier and more accurate the reading of the scale, a vernier is provided in the form of a slide 20 operating in the slot 14 over the guide rod 21 and carrying a vernier card 22 slidable laterally thereon in confining flanges 23 to ride with its edge in physical sliding engagement with the edge of the stationary scale 11.

The vernier is shown as of substantial depth or horizontal thickness and as arched about the manometer tube at 24 so as to provide relatively widely separated corner edges, one in front of and the other behind the tube, which when horizontally aligned will insure accurate reading of the top of the mercury column.

This vernier, as will be seen in Fig. 3, may be further guided by reason of its operation in the slot 14.

To control and yieldingly hold the vernier in various positions of adjustment, it is shown in Fig. 3 as having a spring pressed ball detent 25 in engagement with the supporting rod 21.

For leveling purposes the back foot 26 of the triangular base stand is shown as having vertical screw adjustment at 27 in the base, a lock nut 28 serving to secure it in selected positions of adjustment.

The closed end of the manometer being provided by a U-type loop and cut-off stopcock permits of the tube being fully opened up for quick and thorough cleaning purposes and for filling or emptying out the mercury.

The change-over from absolute to differential measurements can be immediately effected by opening the stopcock and dropping the mercury in the seal trap back into the reservoir.

In use the mercury may be poured into the reservoir until the level in the manometer tube corresponds to zero reading on the scale, as may be accurately determined by bringing the lower edge of the vernier into registry with that point. Differential pressure readings may then be taken with the stopcock open and the higher pressure connected to the reservoir.

To use as an absolute gage, the mercury is drawn up the manometer tube into the trap and the stopcock sealed off. This may be accomplished using vacuum, pressure, or by simply tilting the stand, it being preferred to use vacuum connected with both outlets 9 and 10, as indicated in Fig. 4 with a three-way cut-off stopcock 29 in the connection to the reservoir. With the cocks 7 and 29 open to vacuum and the system pumped out the three-way cut-off stopcock 29 is carefully closed and turned to the air, permitting the mercury to rise gradually in the tube. When the mercury level reaches the stop-cock 7 above this trap the valve is closed off and the gage is then ready for absolute measurements on connecting the system to the reservoir outlet and reading the resulting mercury level in the manometer tube on the scale. The amount of mercury held up in the trap has negligible effect on the zero setting of the instrument.

The ratio of the diameter of the manometer tube to the diameter of the reservoir is chosen so that at a predetermined ambient temperature a single reading on the manometer tube gives a direct pressure reading in mm. of mercury at 0° C. This ratio may be a 3 mm. bore capillary tubing for a reservoir 44.4 mm. inside diameter.

A plastic scale having a coefficient of thermal expansion of the same order of magnitude as mercury is preferably used so that a single reading can be obtained automatically corrected when a reading is taken at an ambient temperature different from the ambient temperature at which the manometer tube ratio has been fixed in order to give a reading in mm. of mercury at zero degrees C. Various plastics are available for this purpose, an example being Vinylite scales printed and laminated for a maximum change of plus or minus 5° C. in ambient temperature, maintaining a precision of 0.1 mm. in 200 mm.

Thus a single reading may be taken, connected for pressure of mercury at 0° C. and with the scale reading correctly for room temperature variations.

The front-to-back depth of the vernier enables the observer to easily take the reading with the eye on a level with the top of the mercury column. The lateral adjustability of the vernier card enables this element to be brought into sliding edge-to-edge engagement with the fixed scale to facilitate quick, close readings.

The structure of the stand, partially enclosing and covering the reservoir at the bottom and the stopcock and U-trap at the top, is important, guarding these parts against possible injury.

What is claimed is:

1. A manometer comprising a stand having a vertically extending guideway, a fixed scale on said stand at one side of said guideway, a manometer tube exposed in said guideway and a vernier slide operable in said guideway in co-operative relation to said fixed scale and a laterally slidable vernier card on said vernier slide adjustable laterally into sliding edge-to-edge engagement with said fixed scale.

2. A manometer of the character disclosed comprising a mercurial manometer column and a Vinylite or like plastic scale cooperatively related thereto and having a temperature coefficient of linear expansion of the same order of magnitude as the volumetric coefficient for mercury.

3. A combined absolute and differential manometer comprising a stand having a manometer scale, a mercury reservoir supported on said stand at the foot of said scale, a manometer tube rising from the bottom of said reservoir and having a reading column portion at the side of said scale, a U-trap at the upper end of said column portion for sealing off the upper end of the column, a pressure-tight shut-off valve in the tube above said U-trap, tubular extensions on the top of said reservoir and above said shut-off valve for applying pressure and vacuum connections to the reservoir and to the upper end of the manometer tube, and a three-way valve connected with said tubular extension on top of the reservoir and arranged in one position to connect said reservoir to atmosphere.

4. A combined absolute and differential well type manometer comprising a closed top mercury well, a single manometer tube connected with and rising from the bottom of said mercury well, a scale associated with said manometer tube, a U-trap at the upper end of said manometer tube for providing a mercury seal for the upper end of the tube, a tubular extension on the top of said well and a tubular extension above said U-trap on the manometer tube for applying pressure and vacuum connections to the well and to the upper end of the manometer tube and a pressure-tight shut-off valve in the tubular extension of the manometer tube above the U-trap and which can be opened to atmosphere to enable use of the instrument as a differential manometer, or closed to hold the mercury seal in the U-trap and permit use of the instrument as an absolute manometer, said manometer tube and said mercury well having a ratio of internal diameters on the order of 3 to 44.4 mm. and said scale being laid off in units of true length in accordance with said proportionate ratio.

5. A manometer comprising a mercury well, a manometer tube rising from said well, said manometer tube and mercury well having a ratio of internal diameters on the order of 3 to 44.4 mm., and a scale associated with said manometer tube laid off in units of true length.

References Cited in the file of this patent

UNITED STATES PATENTS

| Number | Name | Date |
|---|---|---|
| 1,950,497 | Kopp et al. | Mar. 13, 1934 |
| 2,407,568 | Meriam | Sept. 10, 1946 |
| 2,438,228 | Osten | Mar. 23, 1948 |

FOREIGN PATENTS

| Number | Country | Date |
|---|---|---|
| 25 | Great Britain | June 20, 1856 |
| 3,201 | Great Britain | Dec. 31, 1910 |
| 289,212 | Great Britain | Apr. 26, 1928 |
| 890,461 | France | Nov. 2, 1943 |

OTHER REFERENCES

Instruments, Stuart, vol. 15, p. 524, December 1942.

Robertson, Industrial Engineering Chemistry, Analytical Edition, April 1945, pp. 238–239.

Wallace & Tiernan Technical Pub. 264, September 17, 1948.